United States Patent
Hsu et al.

(10) Patent No.: US 10,019,785 B2
(45) Date of Patent: Jul. 10, 2018

(54) METHOD OF PROCESSING HIGH DYNAMIC RANGE IMAGES USING DYNAMIC METADATA

(71) Applicant: NOVATEK Microelectronics Corp., Hsin-Chu (TW)

(72) Inventors: Chia-Jung Hsu, Changhua County (TW); Wan-Ching Tsai, Taipei (TW); Chao-Wei Ho, Hsinchu County (TW); Chih-Chia Kuo, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 96 days.

(21) Appl. No.: 15/063,462

(22) Filed: Mar. 7, 2016

(65) Prior Publication Data

US 2017/0256039 A1     Sep. 7, 2017

(51) Int. Cl.
*G06T 5/00* (2006.01)
*G09G 5/02* (2006.01)

(52) U.S. Cl.
CPC .......... *G06T 5/009* (2013.01); *G09G 5/02* (2013.01); *G06T 2207/20208* (2013.01); *G09G 2320/0276* (2013.01); *G09G 2320/066* (2013.01); *G09G 2320/0666* (2013.01); *G09G 2320/0673* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 2007/0091337 A1* | 4/2007 | Morovic | ............. | H04N 1/6058 358/1.9 |
| 2007/0269132 A1* | 11/2007 | Duan | ...................... | G06T 5/007 382/274 |
| 2011/0292246 A1* | 12/2011 | Brunner | .................. | G06T 5/009 348/231.99 |
| 2013/0114000 A1* | 5/2013 | Atkins | ..................... | H04N 5/20 348/708 |
| 2013/0235072 A1* | 9/2013 | Longhurst | ................ | H04N 1/46 345/605 |
| 2014/0078165 A1* | 3/2014 | Messmer | ............... | H04N 1/603 345/589 |
| 2015/0256719 A1* | 9/2015 | Bishop | ................. | H04N 1/6058 382/167 |
| 2016/0191158 A1* | 6/2016 | Aoyama | ........... | H04B 10/1149 398/172 |
| 2017/0161882 A1* | 6/2017 | Mantiuk | ................. | G06T 5/007 |

* cited by examiner

*Primary Examiner* — Yingchun He
(74) *Attorney, Agent, or Firm* — Winston Hsu

(57) ABSTRACT

A method of performing luminance/brightness adjustment and gamut mapping to high dynamic range images for a display device includes receiving an input image to analyze an image distribution of the input image, generating a scene information of the input image according to the image distribution, and performing luminance/brightness adjustment and gamut mapping to the input image according to the scene information, to generate an output image corresponding to the input image, wherein the scene information is regarded as dynamic metadata of the input image.

6 Claims, 10 Drawing Sheets

METHOD OF PROCESSING HIGH DYNAMIC RANGE IMAGES USING DYNAMIC METADATA

BACKGROUND OF THE INVENTION

1. Field of the Invention

The present invention relates to a method of processing high dynamic range images using dynamic metadata, and more particularly, to a method of processing high dynamic range images using dynamic metadata, to dynamically adjust luminance/brightness levels and gamut mapping.

2. Description of the Prior Art

High dynamic range (HDR) is specified and designed for capturing, processing, and reproducing scene imagery, with increased shadow and highlight detail beyond current standard dynamic range (SDR) or low dynamic range (LDR) video and cinema systems capabilities.

However, a standard television set or display device features SDR or LDR, and may a lower brightness level and a lower gamut range than that of HDR feature, so the standard television set ultimately removes some finer color and brightness details and contrasts from the HDR image.

Recently, HDR related standards are being developed though HDR images/videos are not popular. Thus, there are few television sets supporting HDR and these television sets do not provide an entire solution in reproduction or approximation of HDR effect. For example, conventional color gamut mapping for HDR images is a static algorithm without considering gamut range differences between input HDR videos and the television set, which leads to color-clipping (e.g., color outside SDR gamut range is clipped by the static algorithm) and hue-shift.

Therefore, there is a need to improve the prior art.

SUMMARY OF THE INVENTION

It is therefore an objective of the present invention to provide a method of processing high dynamic range images using dynamic metadata, where static algorithms for image processing can be adaptively and dynamically adjusted based on the dynamic metadata, to improve image quality from scene to scene.

The present invention discloses a method of performing luminance/brightness adjustment to high dynamic range images for a display device. The method includes receiving an input image to analyze an image distribution of the input image, generating a scene information of the input image according to the image distribution, and performing luminance/brightness adjustment to the input image according to the scene information, to generate an output image corresponding to the input image, wherein the scene information is regarded as dynamic metadata of the input image.

The present invention further discloses a method of performing gamut mapping to high dynamic range images for a display device. The method includes receiving an input image to analyze an image distribution of the input image, generating a scene information of the input image according to the image distribution, and performing gamut mapping to the input image according to the scene information, to generate an output image corresponding to the input image, wherein the scene information is regarded as dynamic metadata of the input image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
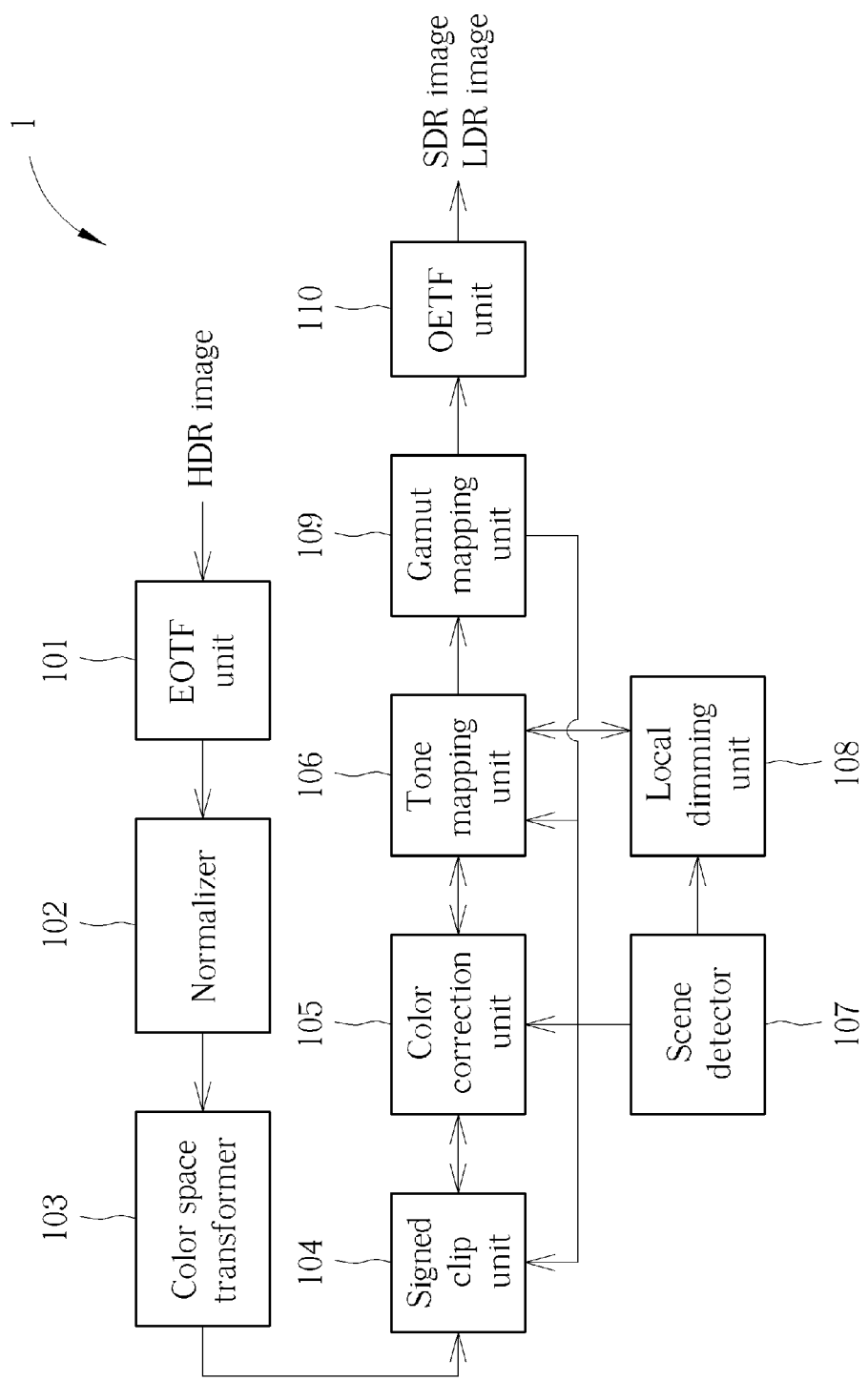
FIG. 1 is a functional block diagram of an image conversion system according to an embodiment of the present invention.

FIG. 1 is a functional block diagram of an image conversion system 1 according to an embodiment of the present invention. The image conversion system 1 is used for converting high dynamic range (HDR) images into standard dynamic range (SDR) images, and includes an electro-optical transfer function (EOTF) unit 101, a normalizer 102, a color space transformer 103, a signed clip unit 104, a color correction unit 105, a tone mapping unit 106, a scene detector 107, a local dimming unit 108, a gamut mapping unit 109, and an optical-electro transfer function (OETF) unit 110.

The EOTF unit 101 is coupled to the normalizer 102 for performing a function that maps digital code value to scene luminance, i.e., transferring non-linear data into linear digital data for image processing. The OETF unit 110 is coupled to the gamma adjustment unit 109 for performing a function that converts linear digital data into non-linear data being displayed by a television set or a display device (not shown in FIG. 1). The OETF unit 110 is derived from EOTF function of the television set or the display device for display physics and characteristics compensation.

The normalizer 102 is coupled to the EOTF unit 101 and the color space transformer 103 for calculating a normal gain of the HDR image according to metadata of the HDR image, to output the normal gain to the color space transformer 103. In detail, the normalizer 102 analyzes the metadata of the HDR image to obtain a maximum code range of the HDR image. For example, the ST2084 standard by Society of Motion Picture and Television Engineers (SMPTE) defines the EOTF with a high luminance range capability of 0 to 10,000 cd/m$^2$ (Candela per square meter), but the metadata Maximum Content Light Level (MaxCLL) defined by Consumer Electronics Association (CEA) 861.3 is 5,000 cd/m$^2$.

For a code range [0-1023] defined by the ST2084, where the code [0] represents 0 cd/m$^2$ and the code [1023] represents 10,000 cd/m$^2$. However, the maximum luminance defined by the MaxCLL is 5,000 cd/m$^2$, so the code range [512-1023] representing the luminance from 5,001 cd/m$^2$ to 10,000 cd/m$^2$ is unused to be clipped by direct luminance mapping. To avoid this situation, after EOTF, the normalizer 102 calculates a normal gain for converting the code range [0-1023] to respectively represent the luminance from 0 cd/m$^2$ to 5,000 cd/m$^2$, which ensures that the full code range [0-1023] is used in luminance mapping.

The color space transformer 103 is coupled to the normalizer 102 and the signed clip unit 104, for performing color space transformation based on an extended-gamut YCbCr (xvYCC) color space to convert the HDR image into a specified domain according to the metadata of the HDR image and a user preference. The specified domain may be a mastering domain or a user defined domain associated with specified display modes or display features.

The signed clip unit 104 is coupled to the color space transformer 103, the color correction unit 105 and the scene detector 107, for adjusting contrast and brightness levels of the television set according to scene information of the HDR image provided by the scene detector 107, an ambient light, display capability and user preference.

The color correction unit 105 is coupled to the signed clip unit 104, the tone mapping unit 106 and the scene detector 107 for generating a color correction curve according to the scene information to perform color saturation compensation.

The tone mapping unit 106 is coupled to the color correction unit 105, the scene detector 107, the local dimming unit 108 and the gamut mapping unit 109, for generating a tone mapping curve according to the scene information to perform global tone mapping. The tone mapping unit 106 also performs local tone mapping for tone-detail preservation. After the global and local tone mapping, the tone mapping unit 106 further performs post-processing to keep tone-detail as much as possible.

The local dimming unit 108 is coupled to the tone mapping unit 106 and the scene detector 107 for dynamically adjusting with the scene detector 107 and interacting with the tone mapping unit 106. The local dimming unit 108 applies adaptive dimming backlight and boost up in one or more specular highlight regions to improve human perception of the image, where the specular highlight region is specified by the scene detector 107 according to the metadata and the scene information.

The gamut mapping unit 109 is coupled to the tone mapping unit 106, the scene detector 107 and the OETF unit 110, for generating nodes value, a protect range and a compression range according to an input gamut range of the HDR image, an output gamut range of the television set, and the scene information to performing 3-dimensional (3D) color volume mapping. The nodes value refers to pixel's code value corresponding to the R, G and B channels. The gamut mapping unit 109 calculates the nodes value, the gamut range, the protect range and the compression range based on the metadata and the scene information, at least one of which can be dynamically adjusted for various scenes. In one embodiment, the 3D color volume mapping is performed in LCH (Lightness, Chromaticity, Hue angle) color domain, which keeps gray and hue consistencies. The gamut mapping unit 109 includes a global smart 3D lookup table (3D-LUT, shown in FIG. 10) to set accurate colorimetry for narrow or wide standard color space.

The scene detector 107 is coupled to the signed clip unit 104, the color correction unit 105, the tone mapping unit 106, the local dimming unit 108 and the gamut mapping unit 109, for detecting and providing the scene information to at least one of the signed clip unit 104, the color correction unit 105, the tone mapping unit 106, the local dimming unit 108 and the gamut mapping unit 109.

Figure 2:
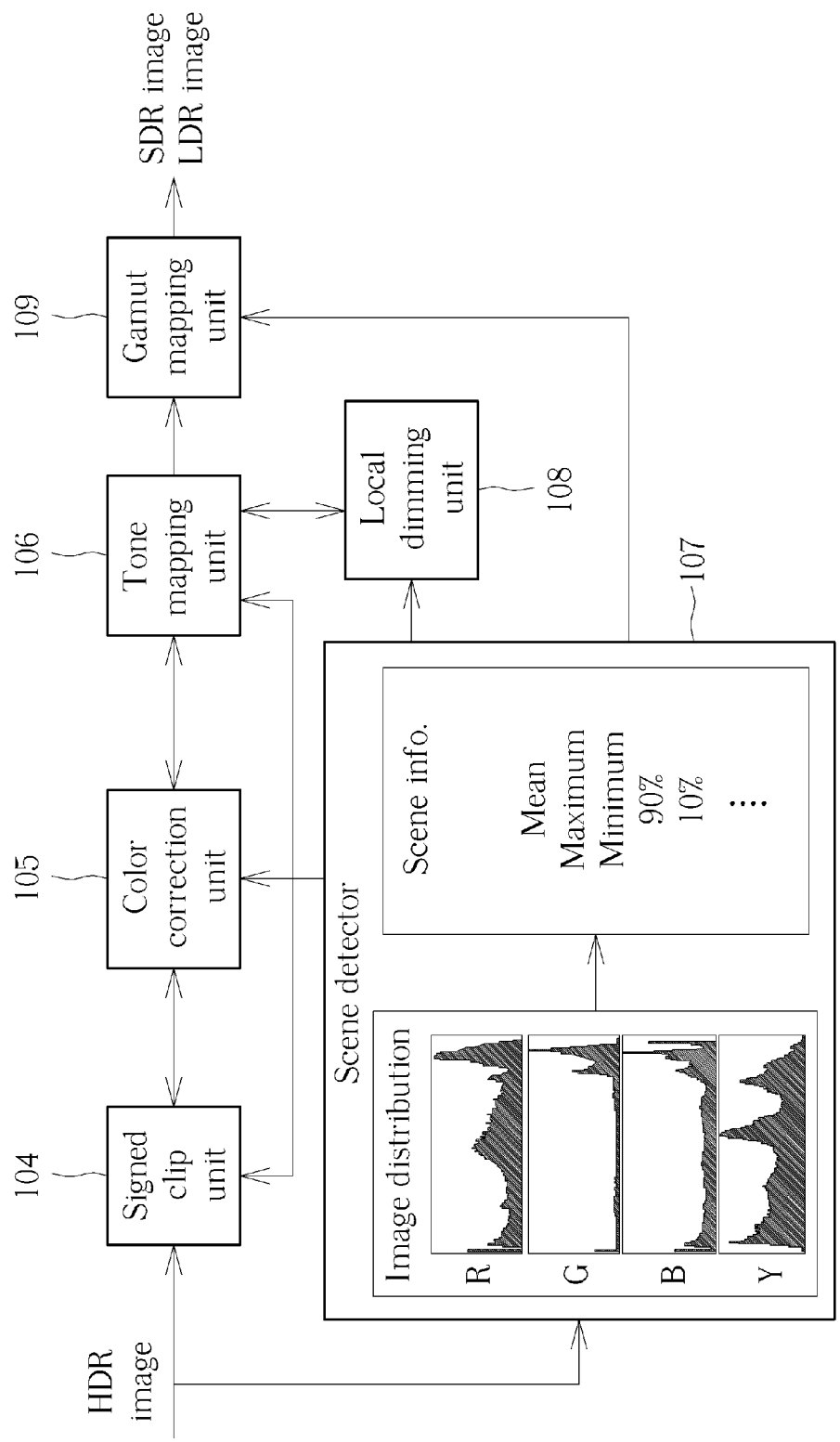
FIG. 2 illustrates interactions between the scene detector, the signed clip unit, the color correction unit, the tone mapping unit, the local dimming unit and the gamut mapping unit shown in FIG. 1 according to an embodiment of the present invention.

Detailed operations of the scene detector 107 can be obtained by referring to FIG. 2, which illustrates interactions between the scene detector 107, the signed clip unit 104, the color correction unit 105, the tone mapping unit 106, the local dimming unit 108 and the gamut mapping unit 109 according to an embodiment of the present invention.

The scene detector 107 receives the HDR image and the metadata to analyze the image distribution of the HDR image to generate the scene information as dynamic metadata for dynamic adjustments from scene to scene. The image distribution includes color and luminance distributions including histograms of the R, G, B and Y channels of the input HDR image. The scene detector 107 further receives the display capability of the television set, the ambient light, the user preference and any programmable features of the television set, at least one of which is considered in generating the scene information. The scene information includes mean, maximum and minimum, a portion (e.g., 90 percent and 10 percent) of pixel counts in the R, G, B and Y channels, and any possible statistic parameters of the HDR image.

The metadata of the HDR image is content-dependent and static, and can be applied in image distribution, in a source device of the HDR image, in output display device, or not at all, depending on the needs and the display capabilities of the source device and the output display device. As the content characteristics and image distributions change from scene to scene, the scene detector 107 controls algorithms for image processing based on the metadata together with the dynamic metadata for dynamic adjustments. In other words, conventionally, signed clip, color correction, tone mapping, local dimming, and gamut mapping are static image processing algorithms without considering differences between scene and scene neither the display range differences between the display device and the HDR image, which leads to image distortion and bad image quality.

To solve this issue, the scene detector 107 provides the scene information to at least one of the signed clip unit 104, the color correction unit 105, the tone mapping unit 106, the local dimming unit 108 and the gamut mapping unit 109, for dynamic image processing. The scene information needs fault tolerance for compatibility in various image processing standards and different display configurations. Therefore, with the scene information or the dynamic metadata, image processing algorithms can be adaptively and dynamically adjusted based on the scene information to improve image quality from scene to scene.

Figure 3:
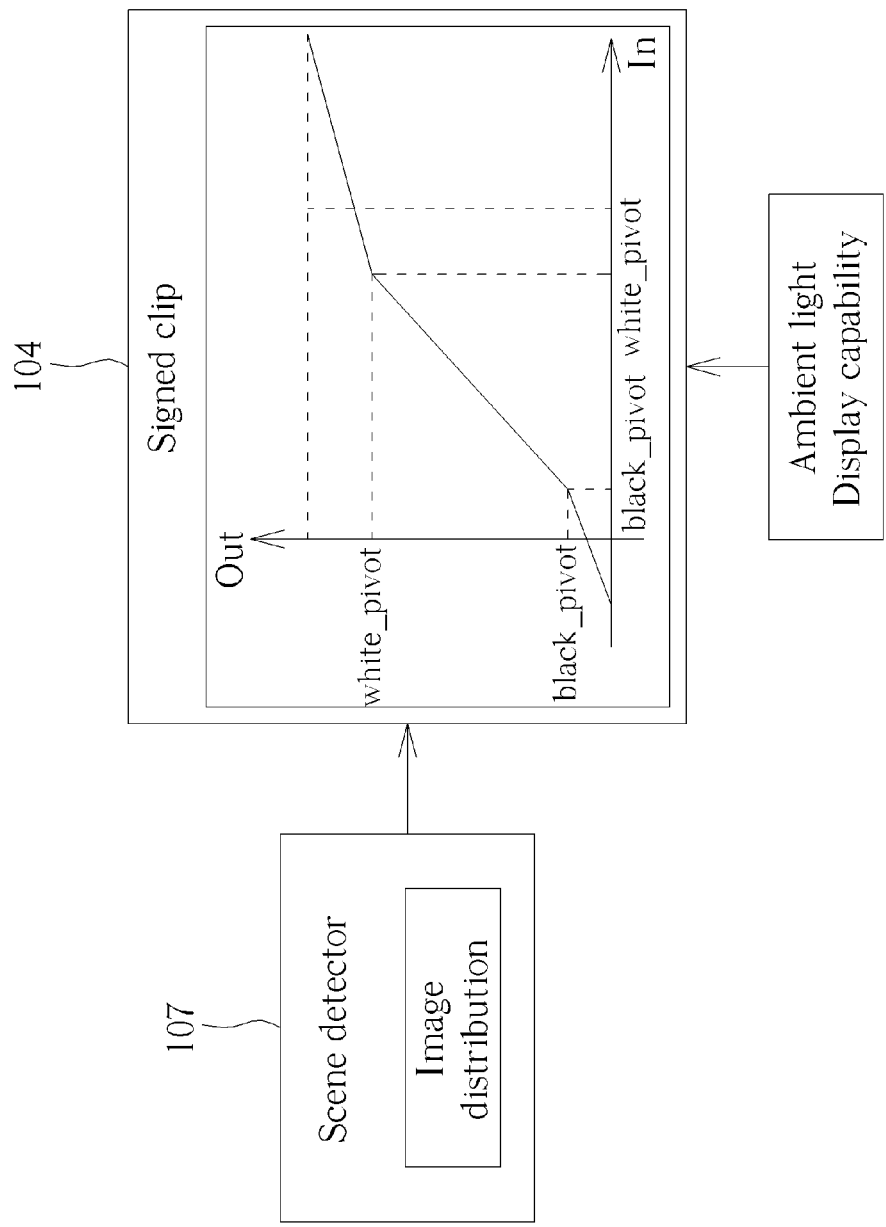
FIG. 3 illustrates interactions between the scene detector and the signed clip unit shown in FIG. 2 according to an embodiment of the present invention.

FIG. 3 illustrates interactions between the scene detector 107 and the signed clip unit 104 according to an embodiment of the present invention. The signed clip unit 104 dynamically adjusts the contrast and brightness levels of the television set by calculating a black pivot and a white pivot and a signed clip curve according to the image distribution, the display capability and the ambient light.

For example, the signed clip unit 104 detects dark regions and bright regions of the HDR image, if the ambient light is too bright, the contrast of the dark regions is reduced by generating the black pivot with a small value, and the contrast of the bright regions is enhanced by generating the white pivot with a small value to preserve more details of the white regions. Otherwise, if the ambient light is too dark, the bright regions may cause uncomfortable to human eyes, so the contrast of bright regions is reduced by generating the white pivot with a large value, and the contrast of the dark regions is enhanced by generating the black pivot with a large value to preserve more details of the dark regions. Therefore, the signed clip unit 104 dynamically adjusts the contrast and brightness levels of the television set to achieve a better viewing experience for the users. In one embodiment, the signed clip unit 104 adaptively calculates the black pivot and the white pivot according to the user preference to achieve a better viewing experience for the users.

Figure 4:
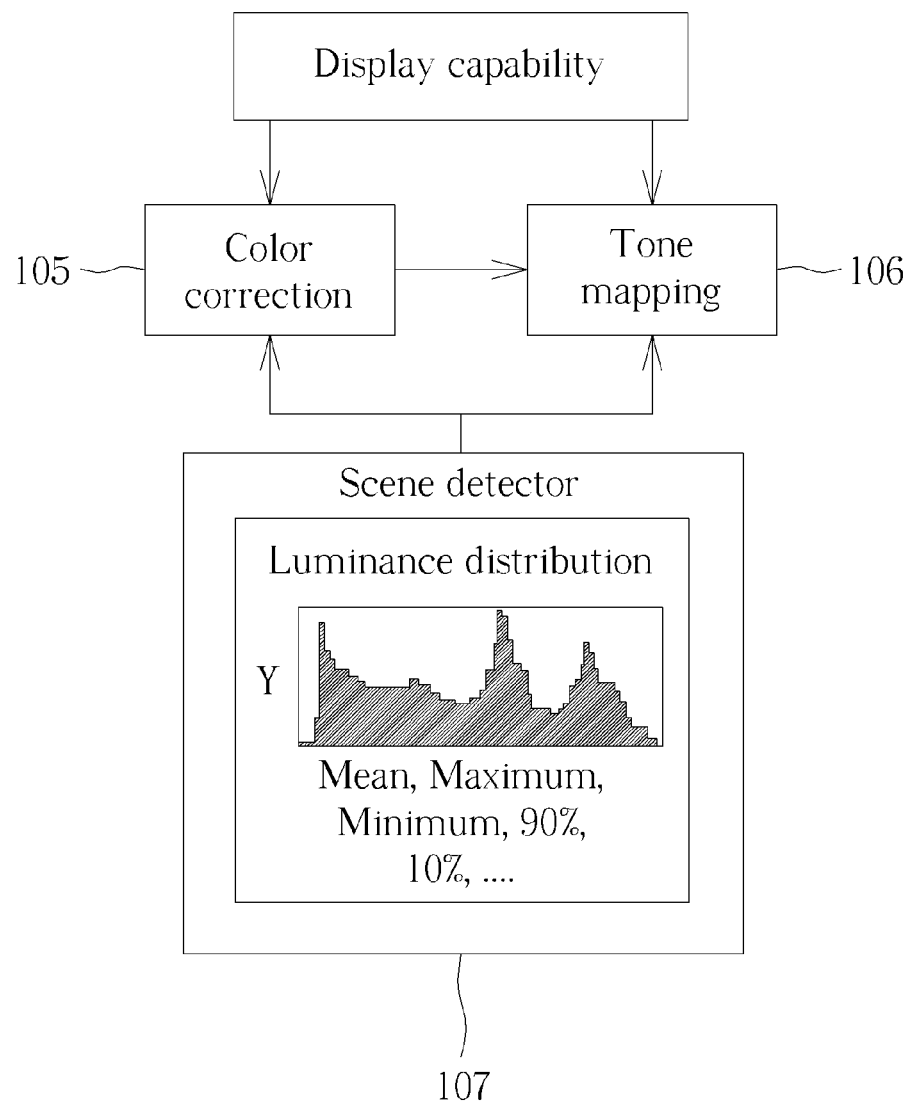
FIG. 4 illustrates interactions between the scene detector, the color correction unit and tone mapping unit shown in FIG. 2 according to an embodiment of the present invention.

FIG. 4 illustrates interactions between the scene detector 107, the color correction unit 105 and the tone mapping unit 106 according to an embodiment of the present invention. The color correction unit 105 and the tone mapping unit 106 cooperatively select the color correction curve for color saturation compensation algorithm and the tone mapping curve for global tone mapping algorithm according to the luminance distribution, the scene information associated with the luminance distribution, and the display capability of the television set.

Figure 5:
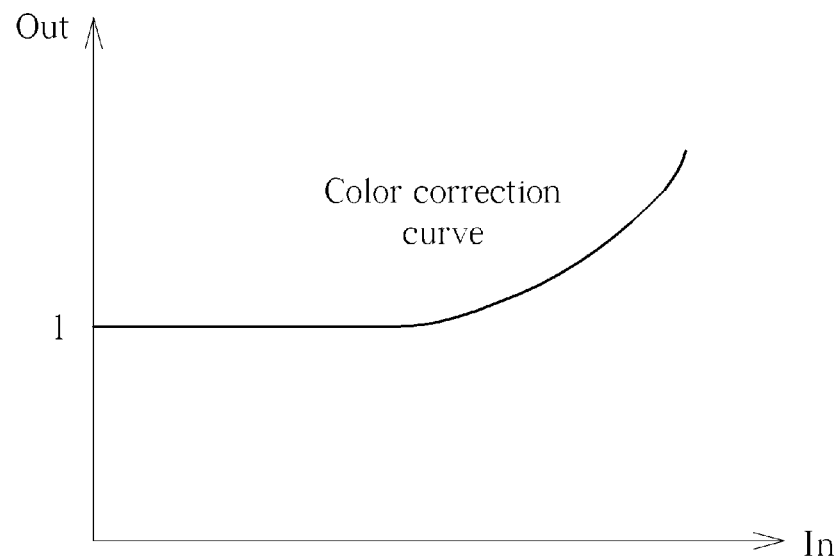
FIG. 5 illustrates a color correction curve according to an embodiment of the present invention.

For example, FIG. 5 illustrates a color correction curve according to an embodiment of the present invention. The color correction unit 105 acquires input and output color saturation ranges according to the metadata of the HDR image and the display capability, and then selects the color correction curve within the input and output conversion ranges according to the luminance distribution and the scene information, herein the luminance distribution and the scene information are regarded as dynamic metadata for dynamic adjustment. The color correction curve is a combination of a line segment and a curved segment, where color saturation of input pixels of the HDR image is totally preserved by the line segment of the color correction curve, while color saturation of input pixels of the HDR image is corrected or compensated by the curved segment of the color correction curve. Therefore, details and contrast after the color correction can be retained.

Figure 6:
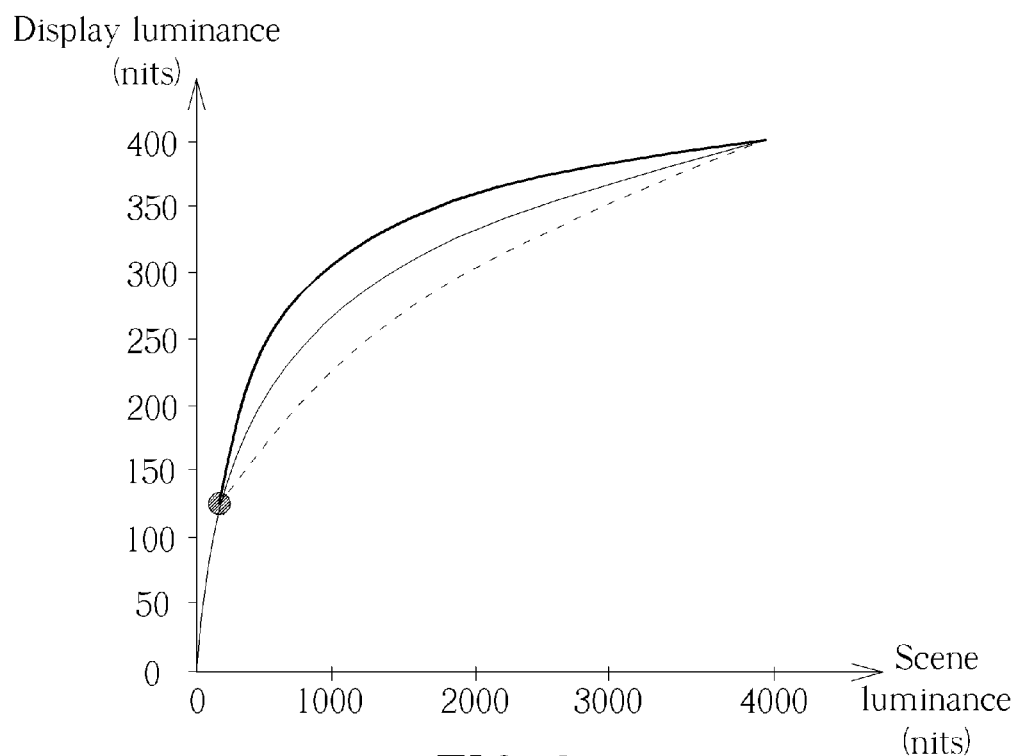
FIG. 6 illustrates a tone mapping curve according to an embodiment of the present invention.

FIG. 6 illustrates a tone mapping curve according to an embodiment of the present invention. The tone mapping unit 106 calculates the tone mapping curve for a dark scene (denoted with a thick solid line) and a tone mapping curve for a bright scene (denoted with a dashed line) according to the scene information. Based on the scene information or the ambient light, or the user preference, the tone mapping unit 106 selects one of the two curves for global tone mapping, so that the tone mapping unit 106 supports algorithm for the metadata of the HDR image and retains flexibility for dynamic metadata.

Note that the tone mapping curve is a programmable curve for creative adjustment, where the users can adjust control points of the programmable curve according to preference to refine the programmable curve. In FIG. 6, the tone mapping curves for dark and bright scenes can be blended into a tone mapping curve for user preference (denoted with a thin solid line). The user can adjust proportions of the curves for dark and bright scenes by moving a control point to refine the tone mapping curve, to achieve creative adjustment. In other words, for the tone mapping unit 106, the user preference indicates proportions of blending the tone mapping curves for dark with bright scenes. Then, the tone mapping unit 106 applies a post-processing to keep tone-detail as much as possible.

Figure 7:
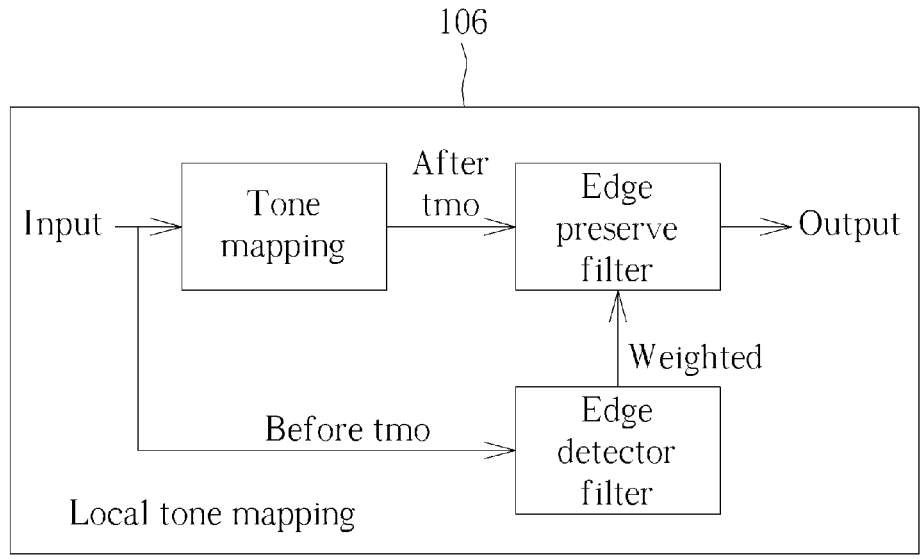
FIG. 7 is a functional block diagram of the tone mapping unit shown in FIG. 2 in operation of local tone mapping for tone-detail preservation.

FIG. 7 is a functional block diagram of the tone mapping unit 106 in operation of local tone mapping for tone-detail preservation algorithm. The tone mapping unit 106 detects edges of objects in the input image by an edge detector filter to generate weighted pixels. The tone mapping unit 106 combines the weighted pixels with input pixels processed with global tone mapping by an edge preserve filter, so as to achieve local tone mapping. For example, the tone mapping unit 106 performs local tone mapping to brighten areas or edges of dark objects, where the input pixels detected to be the edges of dark objects are brighten by the weighted pixels, in order to approximate local contrast of the HDR image within a limited display luminance range of the television set. Weightings of the weighted pixels can be generated by the tone mapping unit 106 according to the image distribution and the scene information. As a result, tone-details around the edges of the objects can be preserved.

Note that operations of the tone mapping and color correction can be swapped, i.e., tone mapping can be performed after color correction, or color correction can be performed after tone mapping. For example, the color correction unit 105 adaptively compensates distorted color because of tone mapping. After these processing, the output image can represent faithful HDR effect within the limited display luminance range.

Figure 8:
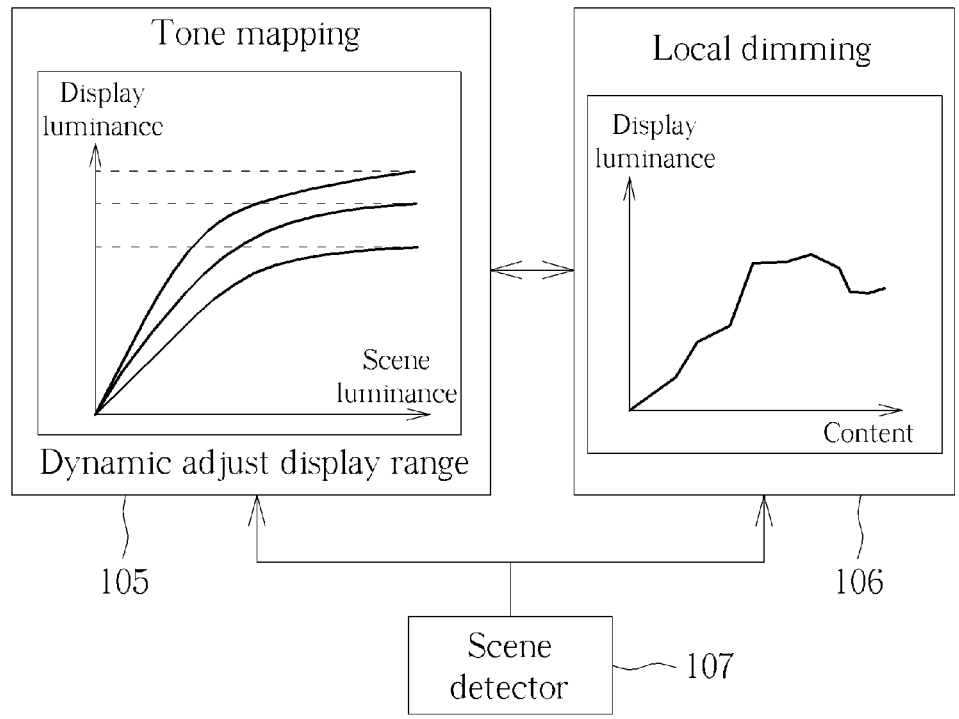
FIG. 8 illustrates interactions between the scene detector, the tone mapping unit and the local dimming unit shown in FIG. 2 according to an embodiment of the present invention.

FIG. 8 illustrates interactions between the scene detector 107, the tone mapping unit 106 and the local dimming unit 108 according to an embodiment of the present invention. The tone mapping unit 106 calculates the display range of a current scene according to the scene information, and dynamically adjusts the display range based on various scenes to calculate the tone mapping curve in FIG. 6, and provide the display range to the local dimming unit 108. The local dimming unit 108 calculates a local dimming curve according to the display range and the scene information, and then calculates corresponded duty (e.g., power duty corresponding to specific brightness levels for a backlight module) of the television set according to the local dimming curve, so as to dynamically adjust local dimming from scene to scene.

Note that local tone mapping aims at preserving local contrast in the HDR image, while the local dimming aims at controlling local brightness in the HDR image. For example, the local dimming unit 108 applies adaptive dimming backlight and boost-up in specular highlight region to improve human perception after the HDR image is converted into an output image. Assume that the HDR image illustrates a dark scene containing a specular highlight region of object (e.g., spotlight or star), the local dimming unit 108 detects pixels and corresponding locations of the specular highlight object to individually control the brightness levels of the specular highlight object in a given part of the display panel of the television set. For example, if the display capability of the television set indicates that the brightness can be boosted up to 500 nits (a regular maximum brightness in FIG. 6 is 400 nits), the local dimming unit 108 to boost-up the brightness of the specular highlight object to 500 nits, which makes the specular highlight object more vivid to improve human perception to the output image.

Figure 9:
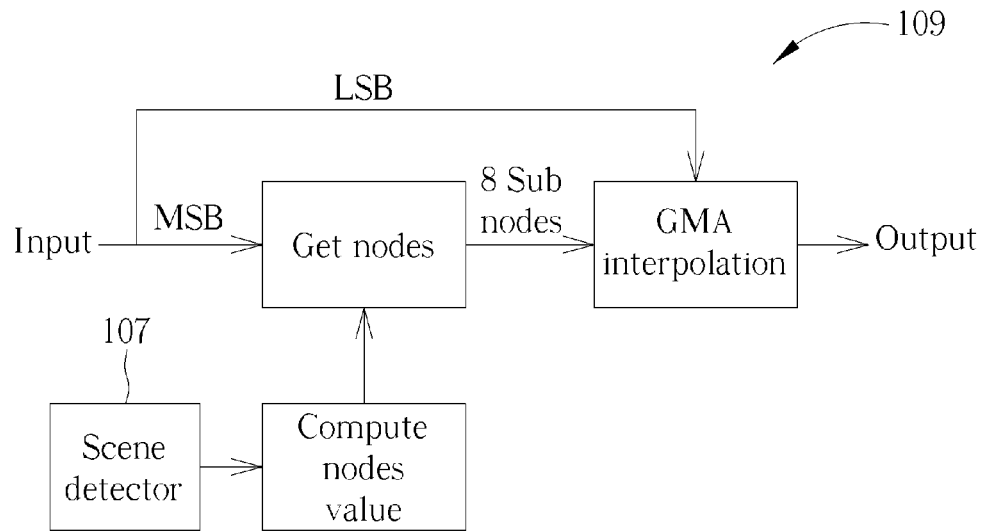
FIG. 9 illustrates a functional block diagram of the gamut mapping unit shown in FIG. 2 according to an embodiment of the present invention.
Figure 10:
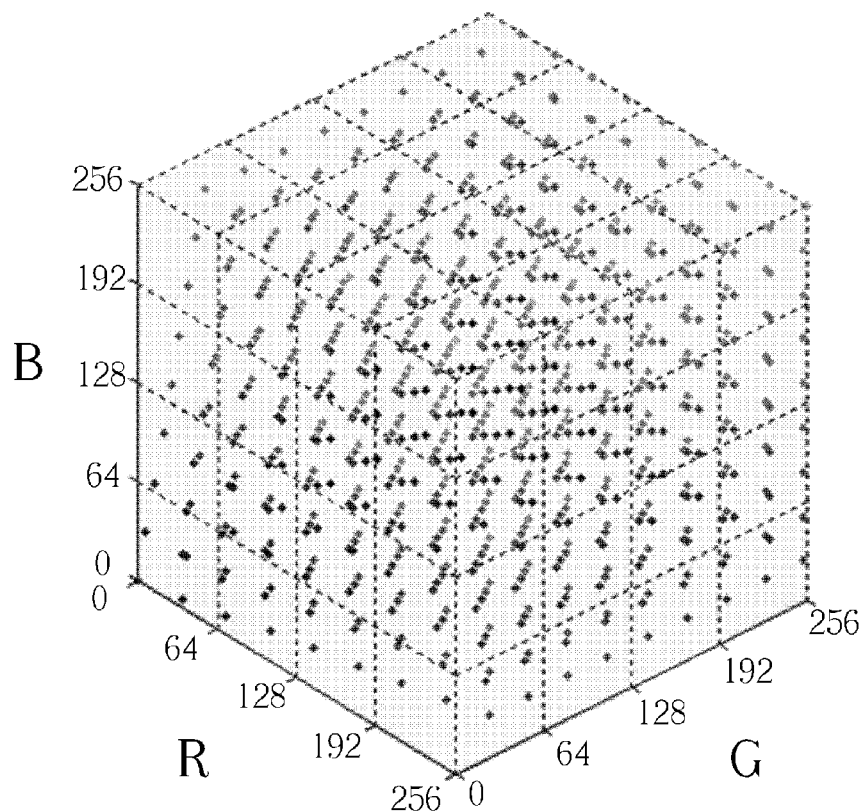
FIG. 10 illustrates a 3D-LUT according to an embodiment of the present invention.

FIG. 9 illustrates a functional block diagram of the gamut mapping unit 109 according to an embodiment of the present invention. FIG. 10 illustrates a 3D-LUT according to an embodiment of the present invention. The gamut mapping unit 109 decides the suitable the nodes value, the input and output gamut ranges, the protect range and the compression range according to the color distribution of the input image to perform 3D color volume mapping to the nodes values based on the 3D-LUT. In FIG. 10, the 3D-LUT describes a color space cube coordinated along the R, G and B channels (axes), and the color space is divided into N×N×N sub-cubes, where N is an integer. Each sub-cube corresponds to eight sub-nodes. In FIG. 9, in digital processing, the gamut mapping unit 109 receives a source node (i.e. one of the nodes value provided by the scene detector 107) to get a most significant bit (MSB) of an input node corresponding to the source node, in order to locate the source node in the 3D-LUT to obtain a sub-cube and eight sub-nodes corresponding to the source node. Then, the gamut mapping unit 109 performs a gamut mapping algorithm (GMA) interpolation according to the eight sub-nodes and a least significant bit (LSB) of the input node, and then generates an output node. The GMA interpolation can be tri-linear interpolation to realize 3D color volume mapping, which is well known in the art, and details of performing GMA interpolation is omitted.

Figure 11:
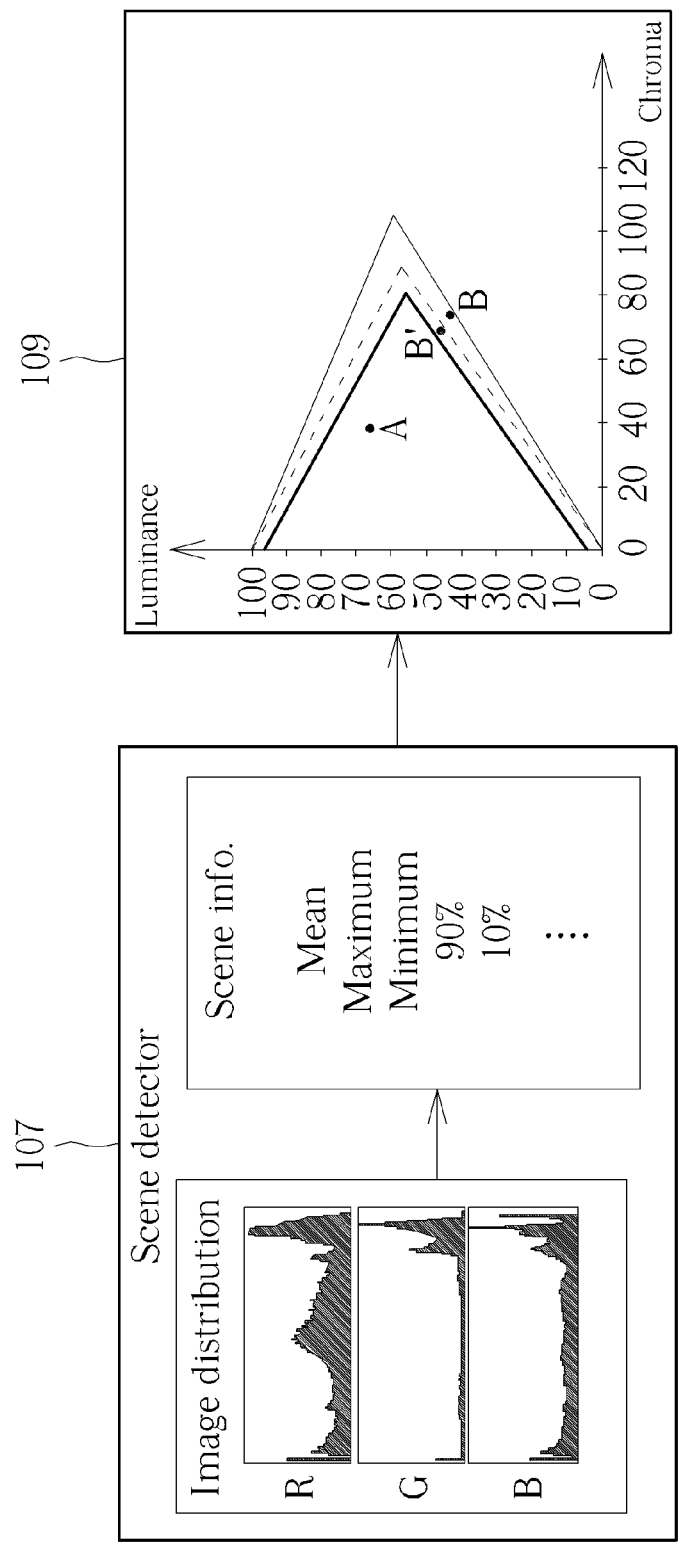
FIG. 11 illustrates operations of gamut mapping according to an embodiment of the present invention.

FIG. 11 illustrates operations of gamut mapping according to an embodiment of the present invention. The gamut mapping unit 109 decides the protect range and the compression range for gamut mapping according to the color distribution of the input image in the R, G and B channels. The nodes or pixels whose color code is inside the protect range are completely preserved, while other nodes or pixels whose color code is outside the protect range will be mapped into the compression range (i.e., chroma compress).

For example, assume that the input HDR image is encoded based on ITU-R Recommendation BT. 2020 (Rec. 2020 or BT. 2020) to be displayed by the television set supporting Rec. 709. In FIG. 11, a full code range of Rec. 709 is enclosed by a dashed line, 0-90 percent of the code range of Rec. 709 is enclosed by a thick solid line, and a full code range of BT. 2020 is enclosed by a thin solid line. In one embodiment, the gamut mapping can achieve gamut mapping between Rec. 709, BT. 2020, Digital Cinema Initiatives (DCI) P3, and any possible color gamut.

Based on the color distribution of the input image, the gamut mapping unit 109 determines that the protect range is set to be 0-90 percent of the code range of Rec. 709, and the compression range is set to be 91-100 percent of the code range of Rec. 709. A node A whose color code is inside 0-90 percent of the code range of Rec. 709 (i.e., the protect range) will be kept in the same position after the gamut mapping, in other words, the color of the node A is completely preserved. Another node B whose color code is outside the full code range of Rec. 709 will be moved in the compression range (i.e., 91-100 percent of the code range of Rec. 709) through the gamut mapping, to become a node B', in other words, the color or node B is adjusted through the gamut mapping. In one embodiment, the gamut mapping for the nodes B or any nodes whose color code is outside the full range of Rec. 709 is performed based on non-linear compression algorithm, by this way, contrast of the nodes B or any nodes whose color code is outside the full range of Rec. 709 can be retained. As a result, colors inside the display gamut range can be represented faithfully by setting the protect range, and contrast of colors outside the display gamut range can be retained by setting the compression range for non-linear compression. Afterwards, the gamut mapping unit 109 performs post-processing for fine-tuning to maintain gray consistency of the output image. Therefore, the output image after the gamut mapping can approximate to HDR effect within a limited gamut range.

Figure 12:
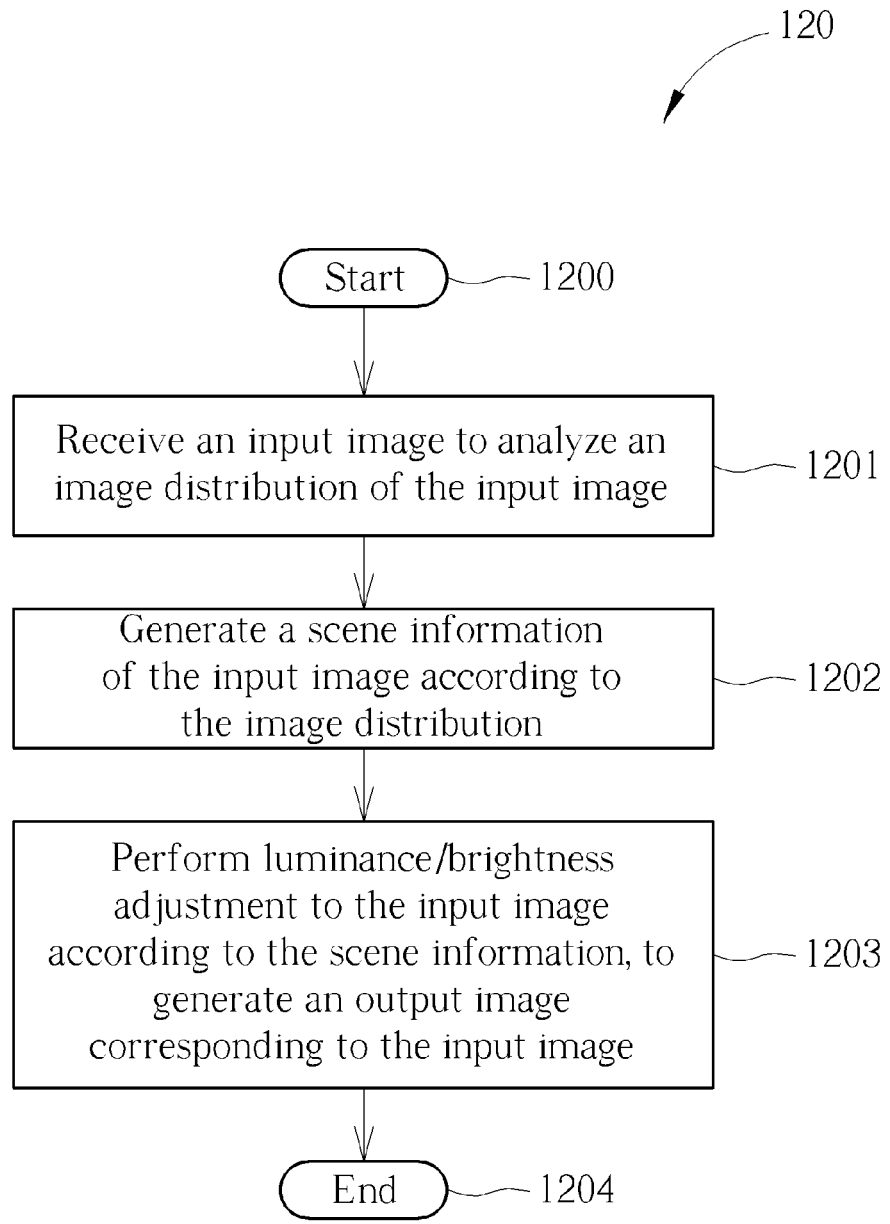
FIG. 12 is a flowchart of a process for luminance/brightness adjustment according to an embodiment of the present invention.

With the scene information provided by the scene detector 107, the signed clip unit 104, the color correction unit 105, the tone mapping unit 106, and the local dimming unit 108 cooperatively handle image processing regarding luminance/brightness adjustment to the input image. FIG. 12 is a flowchart of a process 12 for luminance/brightness adjustment according to an embodiment of the present invention. The process 12 can be compiled into a program code to instruct the scene detector 107, the signed clip unit 104, the color correction unit 105, the tone mapping unit 106, and the local dimming unit 108 performing the luminance/brightness adjustment. The process 12 includes the following steps.

Step 1200: Start.
Step 1201: Receive an input image to analyze an image distribution of the input image.
Step 1202: Generate a scene information of the input image according to the image distribution.
Step 1203: Perform luminance/brightness adjustment to the input image according to the scene information, to generate an output image corresponding to the input image.
Step 1204: End.

In the process 12, Steps 1201 and 1202 are performed by the scene detector 107, and Step 1203 is cooperatively performed by the signed clip unit 104, the color correction unit 105, the tone mapping unit 106, and the local dimming unit 108. Detailed descriptions of the process 12 can be obtained by referring to embodiments of FIG. 2 to FIG. 8.

Figure 13:
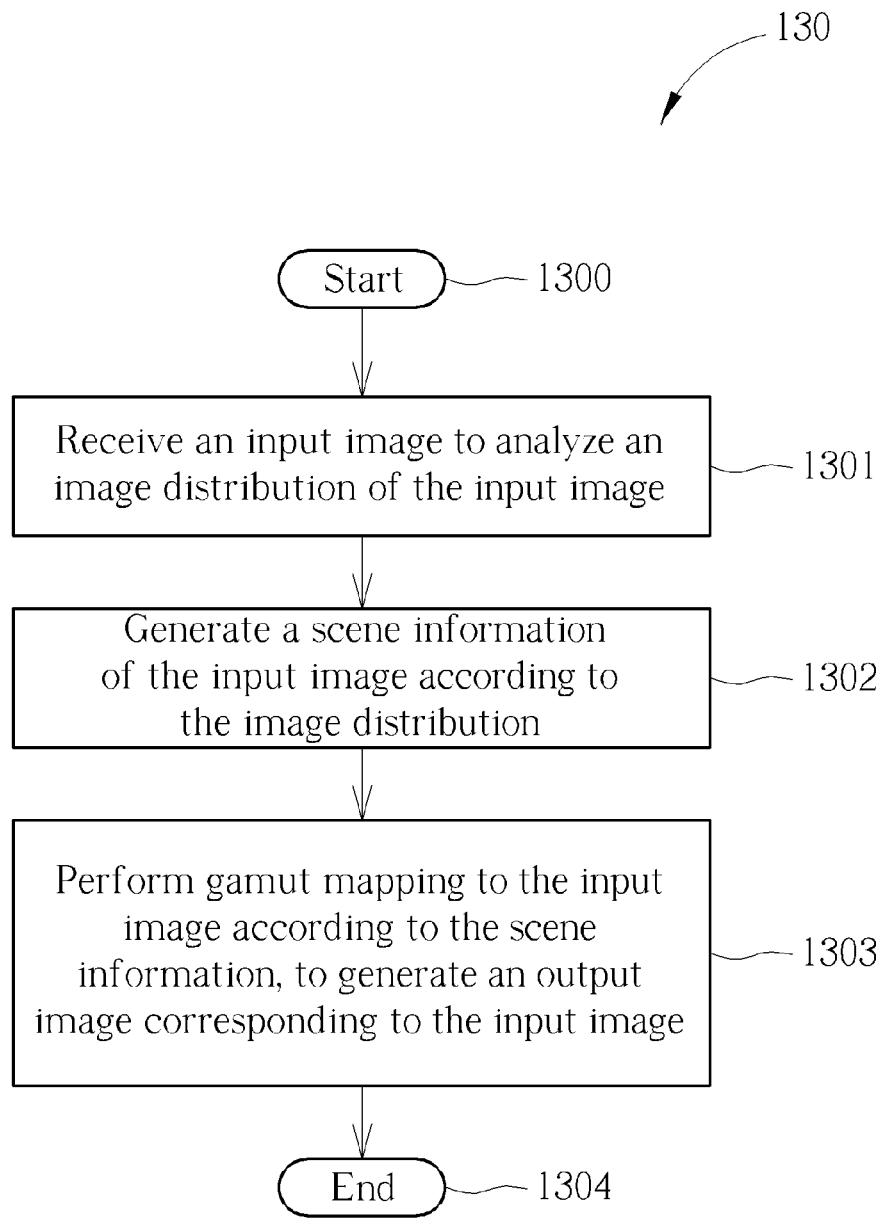
FIG. 13 is a flowchart of a process for gamut adjustment according to an embodiment of the present invention.

With the scene information provided by the scene detector 107, the gamut mapping unit 109 handles image processing regarding gamut mapping to the input image. FIG. 13 is a flowchart of a process 13 for gamut adjustment according to an embodiment of the present invention. The process 13 can be compiled into a program code to instruct the scene detector 107 and the gamut mapping unit 109 performing the gamut adjustment. The process 13 includes the following steps.

Step 1300: Start.
Step 1301: Receive an input image to analyze an image distribution of the input image.
Step 1302: Generate a scene information of the input image according to the image distribution.
Step 1303: Perform gamut mapping to the input image according to the scene information, to generate an output image corresponding to the input image.
Step 1304: End.

In the process 13, Steps 1301 and 1302 are performed by the scene detector 107, and Step 1303 is performed by the gamut mapping unit 109. Detailed descriptions of the process 13 can be obtained by referring to embodiments of FIG. 2 and FIG. 9 to FIG. 11.

To sum up, the image conversion system of the present invention provides an entire solution for luminance/brightness levels adjustment and gamut mapping. The scene detector analyzes image distribution of the input image to generate the scene information as dynamic metadata for dynamic adjustment. Therefore, luminance/brightness levels adjustment and gamut mapping can be dynamically adjusted owing to the dynamic metadata, which retains flexibility for dynamic adjustment to achieve high performance in HDR effect from scene to scene.

Those skilled in the art will readily observe that numerous modifications and alterations of the unit and method may be made while retaining the teachings of the invention. Accordingly, the above disclosure should be construed as limited only by the metes and bounds of the appended claims.

What is claimed is:

1. A method of performing gamut mapping to high dynamic range images for a display device, comprising:
   receiving an input image to analyze a color distribution of the input image;
   determining a protect range corresponding to a first percentage of color codes of the input image and a compression range corresponding to a second percentage of the color codes of the input image based on the color distribution of the input image; and
   moving at least one of the color codes of the input image outside the protect range of the color codes to the compression range by a non-linear compression algorithm to perform gamut mapping to the input image.

2. The method of claim 1, wherein the color distribution comprises a color distribution in red, green, blue channels, and a luminance distribution in a luminance channel.

3. The method of claim 1, further comprising generating a scene information of the input image according to the color distribution, wherein the scene information comprises at least one of a mean, a maximum, a minimum, and a portion of pixel counts in red, green, blue, and luminance channels, and the scene information is regarded as dynamic metadata of the input image.

4. The method of claim 3, further comprising:
   calculating an input gamut range of the input image, a display gamut range of the display device, gamut nodes value, the protect range and the compression range according to the scene information, a display capability of the display device, and a user preference; and
   performing gamut mapping according to the input gamut range, the display gamut range, the gamut nodes value, the protect range and the compression range to generate an output image corresponding to the input image.

5. The method of claim 4, wherein a node of the input image whose color code is inside the protect range is completely preserved.

6. The method of claim 4, wherein the gamut mapping is 3-dimensional color volume mapping in an LCH (Lightness, Chromaticity, Hue angle) color domain.

* * * * *